(12) United States Patent
Hamling et al.

(10) Patent No.: US 10,320,975 B2
(45) Date of Patent: *Jun. 11, 2019

(54) COMMUNICATION SYSTEMS, COMMUNICATION DEVICES, AND RELATED METHODS FOR ROUTING CALLS BETWEEN COMMUNICATION DEVICES HAVING USERS WITH DIFFERENT ABILITIES

(71) Applicant: SORENSON IP HOLDINGS LLC, Salt Lake City, UT (US)

(72) Inventors: Michael Hamling, Sandy, UT (US); Brett Thelin, Herriman, UT (US); Scot L. Brooksby, Highland, UT (US); Merle L. Walker, Sandy, UT (US)

(73) Assignee: SORENSON IP HOLDINGS LLC, Salt Lake City, UT (US)

( * ) Notice: Subject to any disclaimer, the term of this patent is extended or adjusted under 35 U.S.C. 154(b) by 157 days.

This patent is subject to a terminal disclaimer.

(21) Appl. No.: 15/431,537

(22) Filed: Feb. 13, 2017

(65) Prior Publication Data
US 2017/0155762 A1    Jun. 1, 2017

Related U.S. Application Data

(63) Continuation of application No. 14/736,169, filed on Jun. 10, 2015, now Pat. No. 9,571,788.

(51) Int. Cl.
| | |
|---|---|
| *H04M 3/42* | (2006.01) |
| *H04N 7/14* | (2006.01) |
| *H04M 3/523* | (2006.01) |
| *H04L 29/08* | (2006.01) |
| *H04M 3/51* | (2006.01) |
| *H04M 3/46* | (2006.01) |

(52) U.S. Cl.
CPC ...... *H04M 3/42391* (2013.01); *H04L 67/141* (2013.01); *H04L 67/2804* (2013.01);
(Continued)

(58) Field of Classification Search
CPC ... H04L 12/1813; H04L 65/00; H04L 67/141; H04L 67/2804; H04M 3/42059;
(Continued)

(56) References Cited

U.S. PATENT DOCUMENTS

| | | |
|---|---|---|
| 7,478,035 B1 | 1/2009 | Wrench et al. |
| 7,573,985 B2 | 8/2009 | McClelland et al. |

(Continued)

OTHER PUBLICATIONS

1Number Quick Start Guide, at http://www.zvrs.com/services/features/1number, at least as early as Feb. 8, 2012.
(Continued)

*Primary Examiner* — Hemant S Patel
(74) *Attorney, Agent, or Firm* — TraskBritt

(57) ABSTRACT

A group routing server, communication devices, and related methods are described. The group routing server may comprise a processor operably coupled with communication elements and memory, and be configured to determine a destination communication device from among a plurality of communication devices to which an incoming call is to be routed, determine whether an assistive communication service is needed for providing interpretive services based, at least in part, on differing communication abilities between a far-end user associated with a far-end communication device initiating the incoming call and a near-end user associated with the destination communication device, route the incoming call to the assistive communication service according to the routing rules if the assistive communication device is determined to be needed, and route the incoming call directly to the communication service according to the routing rules if the assistive communication device is not determined to be needed.

16 Claims, 4 Drawing Sheets

(52) U.S. Cl.
CPC ..... *H04M 3/4211* (2013.01); *H04M 3/42059* (2013.01); *H04M 3/5233* (2013.01); *H04N 7/147* (2013.01); *H04M 3/465* (2013.01); *H04M 3/5166* (2013.01); *H04M 3/5235* (2013.01); *H04M 2203/158* (2013.01); *H04M 2242/12* (2013.01)

(58) Field of Classification Search
CPC ............. H04M 3/42391; H04M 3/465; H04M 3/5166; H04M 3/5233; H04M 2242/12; H04M 3/4211; H04M 3/5235; H04M 2203/158; H04N 7/147
USPC .......................................................... 379/52
See application file for complete search history.

(56) References Cited

U.S. PATENT DOCUMENTS

| | | | |
|---|---|---|---|
| 8,610,755 B2* | 12/2013 | Brooksby | H04M 11/08 348/14.01 |
| 8,817,966 B2 | 8/2014 | Wrench | |
| 9,485,462 B2 | 11/2016 | Wrench | |
| 9,490,993 B1 | 11/2016 | Wrench | |
| 9,571,788 B2* | 2/2017 | Hamling | H04N 7/147 |
| 2005/0232169 A1* | 10/2005 | McLaughlin | H04M 3/42391 370/261 |
| 2005/0238143 A1* | 10/2005 | Clapp | H04L 12/2854 379/52 |
| 2008/0025493 A1* | 1/2008 | Paras | H04M 3/5125 379/265.12 |
| 2010/0120404 A1* | 5/2010 | Bernal | H04M 3/51 455/417 |

OTHER PUBLICATIONS

1Number User Guide the Z, at http://www.zvrs.com/services/features/1number, at least as early as Feb. 8, 2012.
Z-20 User Guide, at http://www.zvrs.com/products/hardware/z-20/, at least as early as Feb. 7, 2012.

* cited by examiner

COMMUNICATION SYSTEMS, COMMUNICATION DEVICES, AND RELATED METHODS FOR ROUTING CALLS BETWEEN COMMUNICATION DEVICES HAVING USERS WITH DIFFERENT ABILITIES

CROSS-REFERENCE TO RELATED APPLICATION

This application is a continuation of co-pending U.S. patent application Ser. No. 14/736,169, filed Jun. 10, 2015, U.S. Pat. No. 9,571,788 (Feb. 14, 2017), the disclosure of which is hereby incorporated herein in its entirety by this reference.

FIELD

Embodiments of the disclosure relate to systems, devices, and methods for controlling communication systems and, more particularly, to systems, devices, and methods for routing calls between communication devices having users with different abilities, such as hearing abilities or language abilities requiring the use of an assistive communication service.

BACKGROUND

Traditional communication systems, such as standard and cellular telephone systems, enable verbal communications between people at different locations. Communication systems for audibly-impaired individuals (e.g., individuals with hearing impairments, speech impairments, or a combination thereof) may also enable non-audible communications instead of, or in addition to, verbal communications. Some communication systems for audibly-impaired individuals enable communications between communication devices for audibly-incapable individuals (e.g., video phones, web cameras, etc.) and communication systems for audibly-capable individuals (e.g., standard telephones, cellular phones, etc.). For example, a video relay service (VRS) may provide speech to sign language translation services, and sign language to speech translation services for a communication session between a video communication device for an audibly-impaired individual and a traditional communication device for an audibly-capable user. In other words, the VRS may be used to facilitate a conversation between an audibly-impaired user and an audibly-capable person.

The audibly-impaired individual may communicate with a communication assistant (e.g., communicate via sign language), and then the communication assistant conveys the message audibly to a far-end user (e.g., an audibly-capable user). For communication in the other direction, the communication assistant listens to the audibly-capable user and then signs what was spoken to the audibly-impaired user. The communication assistant may, therefore, act as a translator for both the audibly-impaired user (e.g., using sign language) and the far-end user (e.g., communicating via speech communication). Thus, the communication assistant directly communicates with each of the audibly-impaired individual and the audibly-capable individual to facilitate communication between the audibly-impaired individual and the audibly-capable individual. By way of example, Sorenson Communications® offers the Ntouch® VP videophone and the VP-200 videophone that utilize the Sorenson Video Relay Service,® a service that provides sign language interpretation to audibly impaired video phone users.

BRIEF SUMMARY

In some embodiments, disclosed is a group routing server comprising communication elements configured to receive an incoming call to a group unique identifier (ID) associated with an organization having a plurality of communication devices that each have an individual unique ID, memory having routing rules and an ID database stored thereon, and a processor operably coupled with the communication elements and the memory. The processor is configured to determine a destination communication device from among the plurality of communication devices to which the incoming call is to be routed, determine whether an assistive communication service is needed for providing interpretive services based, at least in part, on differing communication abilities between a far-end user associated with a far-end communication device initiating the incoming call and a near-end user associated with the destination communication device, route the incoming call to the assistive communication service according to the routing rules if the assistive communication device is determined to be needed, and route the incoming call directly to the communication service according to the routing rules if the assistive communication device is not determined to be needed.

In some embodiments, disclosed is a method of operating a group routing server dedicated to a defined group of communication devices within an organization. The method comprises receiving incoming calls from a far-end communication device to the group routing server, determining a destination communication device from among the defined group of communication devices within the organization, determining a first communication ability of a far-end user associated with the far-end user device, determining a second communication ability of a near-end user associated with the destination communication device, routing the incoming call to an assistive communication service if the first communication ability and the second communication ability are different, and routing the incoming call directly to the destination communication device if the first communication ability and the second communication ability are the same.

In some embodiments, disclosed is a method of operating a communication device that is included within a defined group of communication devices within an organization serviced by a group routing server. The method comprises receiving an incoming call routed by the group routing server to a destination communication device associated with a near-end user, and entering a communication session between the destination communication device and a far-end communication device that initiated the incoming call. The communication session is routed through an assistive communication service if communication abilities of the near-end user and the far-end user are different, and the communication session is routed directly to the destination communication device if communication abilities of the near-end user and the far-end user are the same. The method further comprises transferring the call to another destination communication device within the organization as processed by the group routing server or another server to determine whether the assistive communication service is needed for the communication session that is transferred to the another destination communication device.

In some embodiments, disclosed is a communication system specifically configured for use by audibly-impaired users to provide interpretive services during calls involving at least one audibly-impaired user and at least one audibly-capable user. The communication system comprises a plurality of communication devices, an assistive communication service having communication assistants for providing sign language interpretive services for communication sessions involving at least one audibly-impaired user and at least one audibly-capable user, and a group routing server. Each communication device has an individual unique identifier (ID) and an indication regarding whether the communication device is associated with an audibly-impaired user or an audibly-capable user. The group routing server has a group unique identifier (ID) for an organization. The group routing server is configured to receive incoming calls to the group unique ID from far-end user devices that are associated with audibly-impaired users, receive incoming calls to the group unique ID from far-end user devices that are associated with audibly-capable users, determine a destination communication device from among the plurality of communication devices for a specific incoming call to be routed, route the specific incoming call directly to the destination communication device responsive to all participants to the specific call being determined to be audibly capable, route the specific incoming call directly to the destination communication device responsive to all participants to the specific call being determined to be audibly impaired, and route the specific incoming call to the assistive communication service responsive at least one participant to the specific call being determined to be audibly capable, and at least one other participant to the specific call being determined to be audibly impaired.

DETAILED DESCRIPTION

Figure 1:
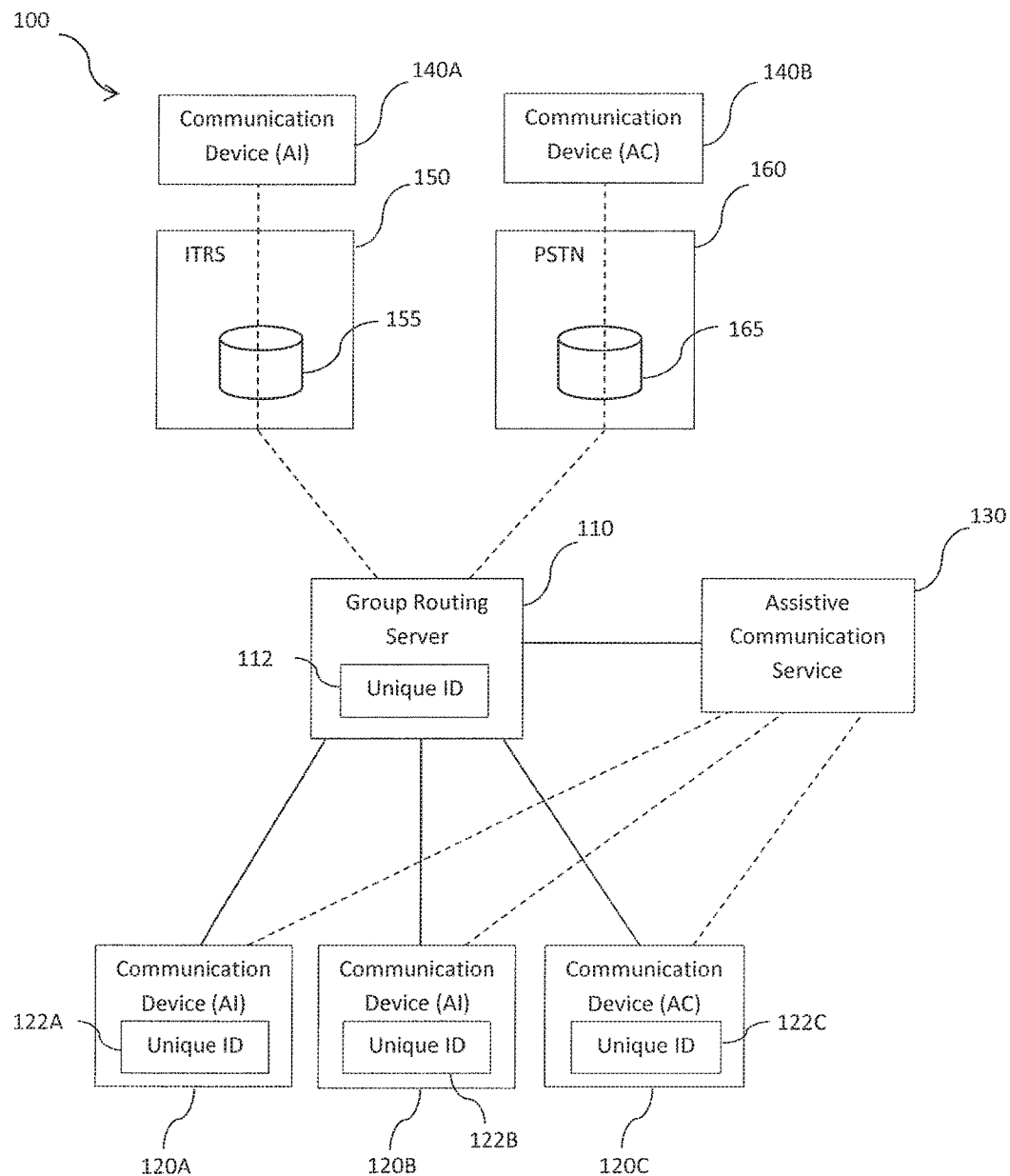
FIG. 1 is a simplified block diagram of a communication system according to embodiments of the disclosure.

In the following detailed description, reference is made to the accompanying drawings which form a part hereof, and in which is illustrated specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In addition, some of the drawings may be simplified for clarity. Thus, the drawings may not depict all of the components of a given apparatus (e.g., device) or method. In addition, like reference numerals may be used to denote like features throughout the specification and figures.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the embodiments disclosed herein may be implemented on any number of data signals including a single data signal.

The various illustrative logical blocks, modules, circuits, and algorithm acts described in connection with embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

A processor herein may be any processor, controller, microcontroller, or state machine suitable for carrying out processes of the disclosure. A processor may also be implemented as a combination of computing devices, such as a combination of a DSP and a microprocessor, a plurality of microprocessors, one or more microprocessors in conjunction with a DSP core, or any other such configuration. When configured according to embodiments of the disclosure, a special-purpose computer improves the function of a general-purpose computer because, absent the disclosure, the general-purpose computer would not be able to carry out the processes of the disclosure. The disclosure also provides meaningful limitations in one or more particular technical environments that go beyond an abstract idea. For example, embodiments of the disclosure provide improvements in the technical field of telecommunications, assistive communication services (e.g., for the audibly-impaired or language barriers), and in particular developing new systems and communication devices that improve the operation of such devices.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more computer-readable instructions (e.g., software code) on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

As used herein, voice-capable networks and voice-capable equipment means networks and equipment that can process, convey, reproduce, or a combination thereof, sounds in the auditory frequencies as analog signals, digital signals, or a combination thereof. As non-limiting examples, such equipment includes conventional telephones, conventional cellular telephones, and conventional computers or handheld devices with microphone and speaker type capabilities. As non-limiting examples, such networks include a telephone network such as the Public Switched Telephone Network (PSTN) and other networks that are compatible and configured to provide communications using digital standards and data packets, an example of which includes Voice Over Internet Protocol (VOIP).

As used herein, video-capable networks and video-capable equipment means networks and equipment that can process, convey, reproduce, or a combination thereof, multi-frame images. As non-limiting examples, such equipment includes conventional cellular telephones with video capability, and conventional computers or handheld devices with camera and display type capabilities. As non-limiting examples, such networks include cellular networks, WiFi networks, wide area networks, hard wired networks and other private data networks configured to provide communications using digital standards and data packets. To facilitate the enhanced bandwidth needs of video phones, the video-capable networks may be implemented as a high bandwidth network such as a DSL, Cable, Ethernet, or other enhanced-bandwidth networking technology.

In general, most video-capable networks would be considered to also be voice-capable networks and most video-capable equipment would also be considered to be voice-capable equipment.

In a typical assistive communication service for users having disabilities, a first communication device may be operated by an audibly-impaired user, and a second communication device may be operated by an audibly-capable user. Generally, when discussing calls, they are referred to from the perspective of the group routing server or communication devices associated with the group or organization as discussed below. Thus, an "incoming call" may originate from a far-end user to an organization that incorporates a group routing server, and ultimately to a near-end communication device of the organization. Of course, it is recognized that "near-end" and "far-end" are relative terms depending on the perspective of the particular user. Thus, the terms "near-end" and "far-end" are used as a convenient way to distinguish between users and devices.

The term "call" refers to a communication session between communication endpoints. The term "incoming call" refers to an incoming request for a communication session to a communication device. These communication sessions should be considered to include communications such as, voice communications, video communications, or a combination thereof.

Embodiments of include systems and methods for controlling communication systems and routing calls for audibly-impaired users. It should be noted that while the utility and application of the various embodiments are described with reference to an audibly-impaired environment, the disclosure also finds application to any environment where such routing may be desirable.

FIG. 1 is a simplified block diagram of a communication system 100 according to an embodiment of the disclosure. The communication system 100 may include a group routing server 110 and a plurality of communication devices 120A, 120B, 120C. The group routing server 110 may be coupled with the communication devices 120A, 120B, 120C and a assistive communication service 130. The assistive communication service 130 may include a assistive communication service that provides interpretive services for individuals with hearing impairments. For example, the assistive communication service 130 may be a video relay service (VRS) that provides sign language (e.g., American Sign Language) interpretation for audibly-impaired users while they communicate with audibly-capable users who cannot communicate through sign language. Through the assistive communication service 130, an audibly-impaired user communicates with a communication assistant through sign language over video communication, while the communication assistant communicates with an audibly-capable user through voice communication. For the video portion of the call, the assistive communication service 130 may be configured to use a session server that administers video communication sessions using a session initiation protocol (SIP), an H.323 protocol, or other suitable protocol.

The group routing server 110 may be a dedicated server(s) for a defined number of communication devices 120A, 120B, 120C that are part of a common group (i.e., organization). For example, the common group may part of a business, a school, a governmental agency, or other entity that may have a group of communication devices 120A, 120B, 120C in their control. The group routing server 110 may be configured to receive incoming calls from far-end communication devices 140A, 140B and to route the incoming calls to the communication devices 120A, 120B, 120C. The group routing server 110 may be configured to determine whether to involve the assistive communication service 130 in the call as will be discussed further below.

The types of entities that may benefit from such a system may be those entities that employ individuals who are audibly-impaired and/or provide services for audibly-impaired individuals such that at least one of the parties to the call may involve an audibly-impaired user who may need the translation services provided by the assistive communication service 130. In some embodiments, there may be a combination of audibly-impaired users and audibly-capable users on either side of the call. As a result, the group routing server 110 may be configured to route calls to some users who are audibly impaired for one call, and other users who are audibly capable in another call. In addition, the group routing server 110 may be configured to receive calls from far-end users who are audibly impaired or audibly capable during different calls. The group routing server 110 may be configured to involve the assistive communication service 130 in the call responsive to determining at least one of each type of user participating in the call, and otherwise routing the call through without involving the assistive communication service 130.

As an example of this operation, the different communication devices 120A, 120B, 120C may be operated by different users who have different abilities. The first communication device 120A and the second communication device 120B may be operated by audibly-impaired users (indicated by the AI notation), and the third communication device 120C may be operated by an audibly-capable user (indicated by the AC notation). Similarly, the far-end communication devices 140A, 140B may be operated by different users who have different abilities. For example, the fourth communication device 140A may be operated by an audibly-impaired user (indicated by the AI notation), and the fifth communication device 140B may be operated by an audibly-capable user (indicated by the AC notation). Thus, calls may have a number of different combinations of parties participating to a call. In situations where there are two parties to a call, the two parties may be audibly-capable, audibly-impaired, or a combination thereof. In situations where there may be more than two parties to a call (e.g., a conference call), other combinations may be present depending on the number of participants.

Each communication device 120A, 120B, 120C may be assigned its own individual unique identifier (ID) 122A, 122B, 122C to which an incoming call may be routed. The group routing server 110 may also be assigned its own group unique ID 112. For example, an organization may desire to provide a group number to which outsiders may call as a contact number for the organization, after which the call may be routed to the communication device for an appropriate individual within the organization. This may simplify operations for the organization who may be able to only publish, market, and manage one number.

The individual unique IDs 122A, 122B associated with the audibly-impaired users may include one or more of a phone number, IP address, device name and/or domain, or other similar identifier used by a specific system. Phone numbers may be a 10 digit number according to the U.S. convention or other type of number for other countries' conventions. In some embodiments, these individual unique IDs 122A, 122B may be managed by an Internet-based Telecommunications Relay Service (ITRS) database 155 that provides a directory of the individual unique IDs for audibly-impaired users. Thus, the ITRS database 155 enables relay service providers the ability to maintain and make available the individual unique IDs 122A, 122B for their equipment. In some embodiments, each individual unique ID 122A, 122B may be represented in different forms (e.g., a phone number and an IP address), and the ITRS database 155 may provide a mapping between the two forms. For example, ITRS database 155 may map a 10-digit phone number to an IP address using an industry-standard electronic number mapping (ENUM) protocol, in which the 10 digit phone number is used to query the database and a uniform resource identifier (URI) is returned. The URI may include an IP address for the appropriate communication device to which the call is routed. In some embodiments, the URI may include a username and domain that can be resolved to an IP address.

The individual unique ID 122C associated with an audibly-capable user may also include one or more of a phone number, IP address, device name and/or domain, or other similar identifier used by a specific system. Although, communication devices associated with audibly-capable users typically include just a phone number associated with the public switched telephone network (PSTN) that may also have a PSTN database 165 maintaining a directory of phone numbers used to perform call routing. As VOIP becomes more and more ubiquitous for calls, the use of IP addresses may also become more common in all types of calls. So that audibly-impaired users may receive calls from hearing-capable users, the individual unique IDs 122A, 122B associated with the hearing-impaired users' devices may also be registered in the PSTN database 165 for the PSTN 160 to route the calls to the ITRS to route the call to the appropriate destination.

The group unique ID 112 for the group routing server 110 may also include one or more of a phone number, IP address, device name and/or domain, or other similar identifier used by a specific system. In some embodiments, the group unique ID 112 may include a phone number registered in both the PSTN database 165 and the ITRS database 155. In some embodiments, the group number may include an IP address or username/domain that is resolved from a phone number. As a result, the group routing server 110 may receive calls from either the ITRS 150 or the PSTN 160 when the far-end user initiates the call using the group unique ID 112 regardless of whether the far-end user is audibly-impaired or audibly-capable. Thus, the group routing server 110 may be configured to receive incoming calls from both PSTN-based communication devices (e.g., telephone, fiber optic, cellular, cable, etc.) and IP-based communication devices (e.g., VOIP).

Depending on whether a communication assistant at the assistive communication service 130 is needed (e.g., one party to the call is an audibly-capable user and another party is an audibly-impaired user), the group routing server 110 may be configured to route the call through the assistive communication service 130. If a communication assistant at the assistive communication service 130 is not needed (e.g., all parties are audibly-capable or all parties are audibly impaired), the group routing server 110 may be configured to route the call directly to the desired near-end communication device 120A, 120B, 120C to engage in a person-to-person communication session.

As an example of operation, the fourth communication device 140A (associated with an audibly-impaired far-end user) may initiate a call by using the group unique ID 112 for the group routing server 110, with the first communication device 120A (associated with an audibly-impaired near-end user) as the ultimate destination of the call. The group routing server 110 may determine that both parties to the call will be audibly-impaired, and route the call through to the first communication device 120A without involving the assistive communication service 130. As a result, the audibly-impaired users may participate in a person-to-person video communication session in which they can communicate via sign language without needing a communication assistant interpreter.

As another example of operation, the fourth communication device 140A (associated with an audibly-impaired far-end user) may initiate a call by using the group unique ID 112 for the group routing server 110, with the third communication device 120C (associated with an audibly-capable near-end user) as the ultimate destination of the call. The group routing server 110 may determine that there is at least one party to the call who will be audibly-impaired and at least another party who will be audibly-capable, and route the call to the assistive communication service 130 to be involved in the communication session. As a result, the users may participate in an assisted communication session in which the communication assistant provides the desired interpretation services.

As another example of operation, the fifth communication device 140B (associated with an audibly-capable far-end user) may initiate a call by using the group unique ID 112 for the group routing server 110, with the first communication device 120A (associated with an audibly-impaired near-end user) as the ultimate destination of the call. The group routing server 110 may determine that there is at least one party to the call who will be audibly-impaired and at least another party who will be audibly-capable, and route the call to the assistive communication service 130 to be involved in the communication session. As a result, the users may participate in an assisted communication session in which the communication assistant provides the desired interpretation services.

As an example of operation, the fifth communication device 140B (associated with an audibly-capable far-end user) may initiate a call by using the group unique ID 112 for the group routing server 110, with the third communication device 120C (associated with an audibly-capable near-end user) as the ultimate destination of the call. The group routing server 110 may determine that both parties to the call will be audibly-capable, and route the call through to the third communication device 120C without involving the assistive communication service 130. As a result, the audibly-capable users may participate in a person-to-person video communication session in which they can communicate via sign language without needing a communication assistant interpreter.

In some embodiments, the call may be transferred between the communication devices 120A, 120B, 120C within the organization. For example, the group unique ID 112 may cause an incoming call to be first received by a receptionist or other operator who may then transfer the call to the desired communication device 120A, 120B, 120C. The group routing server 110 may be configured to determine whether the assistive communication service 130 is needed for the call with the receptionist, and route the call to the assistive communication service 130 as needed. If the receptionist transfers the call to another user, the group routing server 110 may again determine if the assistive communication service 130 is needed for the call with the new near-end user. Other situations for transferring calls are contemplated, including transferring calls that were received by the wrong party or for which another individual would be more appropriate to handle the call. In some systems, the call may be received first by an automated menu system before being routed to a live individual. These situations will be discussed further below.

In some situations, the far-end user may know the individual unique ID 122A, 122B, 122C as a direct number (e.g., bypassing a receptionist or automated menu system). In some embodiments, the call may be sent directly to the corresponding communication device 120A, 120B, 120C without being received by the group routing server 110. In such an embodiment, the determination for whether or not to involve the assistive communication service 130 may be performed by the ITRS 150 according to its conventional operations. In some embodiments, however, the routing rules of the ITRS 150 may be altered such that all calls for a given organization are first received by the group routing server 110 but with the identification of the direct ID being used. As a result, the group routing server 110 may perform the determination regarding involvement of the assistive communication service 130 while automatically routing the call to directly the corresponding communication device 120A, 120B, 120C instead of the normal procedure (e.g., receptionist, automated menu system, etc.) if the group unique ID 112 of the group routing server 110 were used.

Of course, it should be recognized that there could be any number of communication devices depending on the size of the organization for the common group. Three communication devices 120A, 120B, 120C is shown herein merely as an example. Each communication device 120A, 120B, 120C may include control circuitry (e.g., processor, memory, etc.) operably coupled to communication elements (e.g., transmitter, receiver, transceiver, wired/wireless interfaces, etc.) to control operations thereof. Each communication device 120A, 120B, 120C may also include other elements such as microphones, speakers, cameras, electronic displays, input devices (e.g., remote control, keypad, touch screen), etc. to facilitate communication depending on its configuration for audibly-impaired users or audibly-capable users.

It should also be recognized that an organization may have multiple group routing servers 110, each with their own group unique ID 112. For example, the organization may publish different numbers for different departments within the same organization. For example, a technical support number may assigned to a first group routing server, a billing number may be assigned to a second group routing server, a sales number may be assigned to a third group routing server, and so on. Each of these group routing servers may manage a group of communication devices as discussed above. In some embodiments, different group routing servers may be configured to have the ability to route calls to the same communication device (e.g., the user has responsibilities in multiple areas). In some embodiments, the different group routing servers may be configured to have the ability to transfer calls to each other. For example, if an outside caller calls the sales number when they need assistance from technical support.

In some embodiments, the assistive communication service 130 may be a language service that provides translation services if the parties to the call do not speak the same language. For example, one party of the call may speak English and another party may speak Spanish. The call may include information (e.g., metadata) that indicates the language of the caller such that the group routing server 110 may also check the language of the two parties, and route the call to a language assistive communication service if the two parties to the call do not have the same language capabilities. In some embodiments, the language of the caller may be determined based on a country of origin. For example, an organization may receive calls from foreign countries where the calling party may speak a different language than the person who is intended to be the recipient of the call.

Figure 2:
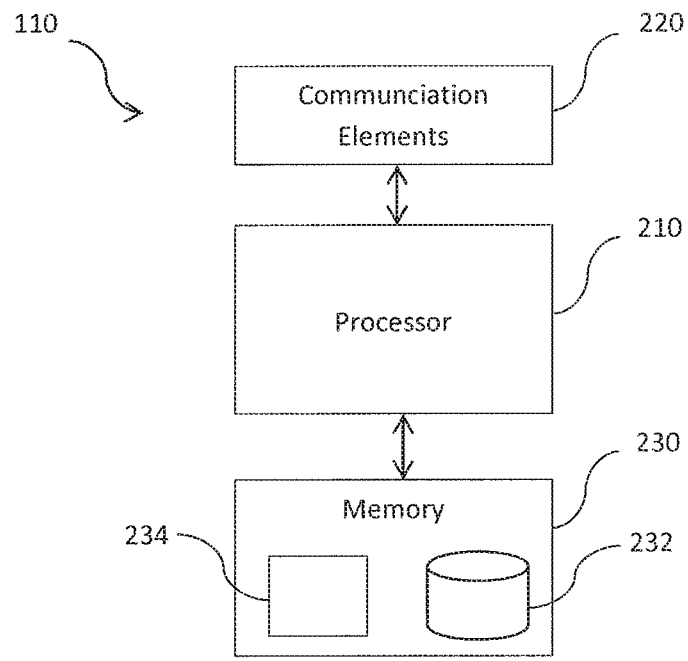
FIG. 2 is a simplified schematic block diagram of the group routing server according to an embodiment of the disclosure.

FIG. 2 is a simplified schematic block diagram of the group routing server 110 according to an embodiment of the disclosure. As discussed above, the group routing server 110 may be configured to manage incoming calls from both audibly-capable or audibly-impaired far-end users to a group number for a defined set of communication devices of a group. The group routing server 110 is also configured to route the incoming calls to an assistive communication service based on the capabilities of the intended parties for the call. The group routing server 110 may include a processor 210 operably coupled with communication elements 220 and memory 230.

The communication elements 220 may be configured to receive the incoming calls to the group routing server 110, such as from either PSTN-based communication devices (e.g., telephone, fiber optic, cellular, cable, etc.) or IP-based communication devices (e.g., VOIP). The communication elements 220 may also be configured to transmit the routed calls to either the assistive communication service 130 or the communication devices 120A, 120B, 120C as determined by the routing rules 234 of the group routing server 110.

The memory 230 may have an ID database 232 and routing rules 234 stored therein. The ID database 232 may include a list of the individual unique IDs 122A, 122B, 122C managed by the group routing server 110 within the organization, as well as whether or not the corresponding communication device 120A, 120B, 120C is specifically configured for use by an audibly-impaired user. The memory 230 may also include instructions stored therein for execution by the processor to control the operation thereof.

The processor 210 may be configured to determine whether the parties to the call are either audibly capable or audibly impaired. In some embodiments, the determination for the destination user (i.e., near-end user) may be based, at least in part, on the information stored in the ID database 232 for the organization. In some embodiments, the determination for the origination user (i.e., far-end user) may be based, at least in part, on detecting whether the call is received from the ITRS 150 or the PSTN 160. In some embodiments, the determination for the origination user may be based, at least in part, on additional data transmitted with the call. For example, the signaling involved with the call (e.g., using SIP), metadata, etc. may inform the group routing server 110 if the call originates from an audibly-capable user or an audibly-impaired user.

As discussed above, the processor 210 may be configured to route calls to a common destination (e.g., receptionist, automated menu system, etc.) in the first instance, after which calls may be further transferred to a desired destination after further information is received. In some embodiments, additional information may be transmitted with the incoming call itself that may be used by the processor 210 to route the call to a desired destination. For example, a direct dial number may have been used to initiate the call. In another example, data from the far-end communication device may be transmitted with the call. For example, health data (e.g., reboots, crashes, login issues, etc.) stored by the far-end communication device may be transmitted with the incoming call which may indicate that the call should be routed directly to a technical support representative without going through a receptionist or automated menu system. Of course, the determination may also be made as to whether the assistive communication service 130 should be included in the call. As discussed above, the far-end communication device may know the language (e.g., Spanish) of the far-end user such that the processor 210 may automatically route the call to the appropriate destination communication device with a user who could handle that call. If a language assistive communication service is available, the call could be routed to such a language assistive communication service to provide interpretive services if the two parties to the call do not have the same language capabilities.

Figure 3:
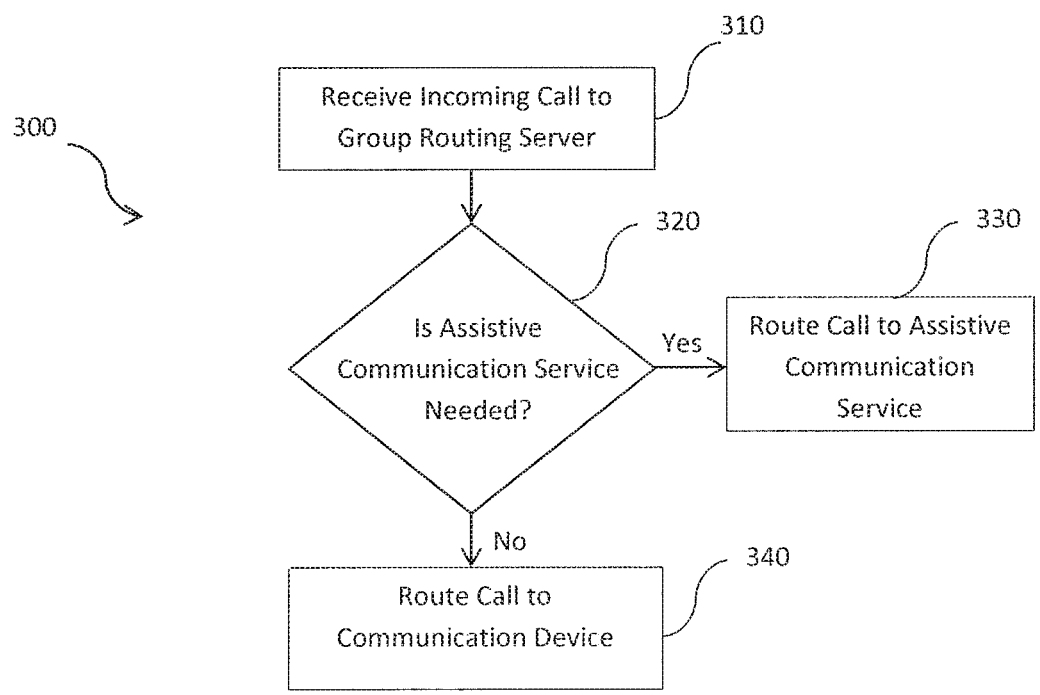
FIG. 3 is a flowchart illustrating a method for operating a group routing server according to an embodiment of the disclosure.

FIG. 3 is a flowchart 300 illustrating a method for operating a group routing server according to an embodiment of the disclosure. At operation 310, an incoming call is received by a group routing server from a far-end user. As discussed above, the group routing server may be addressed by a group number for an organization a having plurality of communication devices. The group routing server may determine which of the communication devices should be the destination device. At operation 320, the group routing server may determine whether a assistive communication service is needed for the call. This determination may be made based on routing rules stored by the group routing server as well as information about the intended parties on each side of the call.

For example, if it is determined that the originator is an audibly-capable user and the destination user is an audibly-impaired user, the assistive communication service may be needed. Similarly, if it is determined that the originator is an audibly-impaired user and the destination user is an audibly-capable user, the assistive communication service may be needed. As a result, the call may be routed to the assistive communication service at operation 330 so that an interpreter may join the call to provide sign language translation between the participants to the call.

For example, if it is determined that the originator is an audibly-capable user and the destination user is an audibly-capable user, the assistive communication service may not be needed. Similarly, if it is determined that the originator is an audibly-impaired user and the destination user is an audibly-impaired user, the assistive communication service may not be needed. As a result, the call may be routed directly to the desired destination communication device at operation 340 so that the participants to the call communicate in a person-to-person communication session without the need for the assistive communication service. For a person-to-person communication between audibly-impaired users, the communication devices may include video phones for the audibly-impaired users to communicate via sign language using video. For a person-to-person communication between audibly-capable users, the communication devices may include phones for the audibly-capable users to communicate via voice, which may or may not also include a video feed. As discussed above, the assistive communication service may provide other forms of language translation in some embodiments, such as if the two parties to a call do not speak the same language (e.g., English, Spanish, etc.). If the parties do speak the same language, such a language translation service may not be needed.

Figure 4:
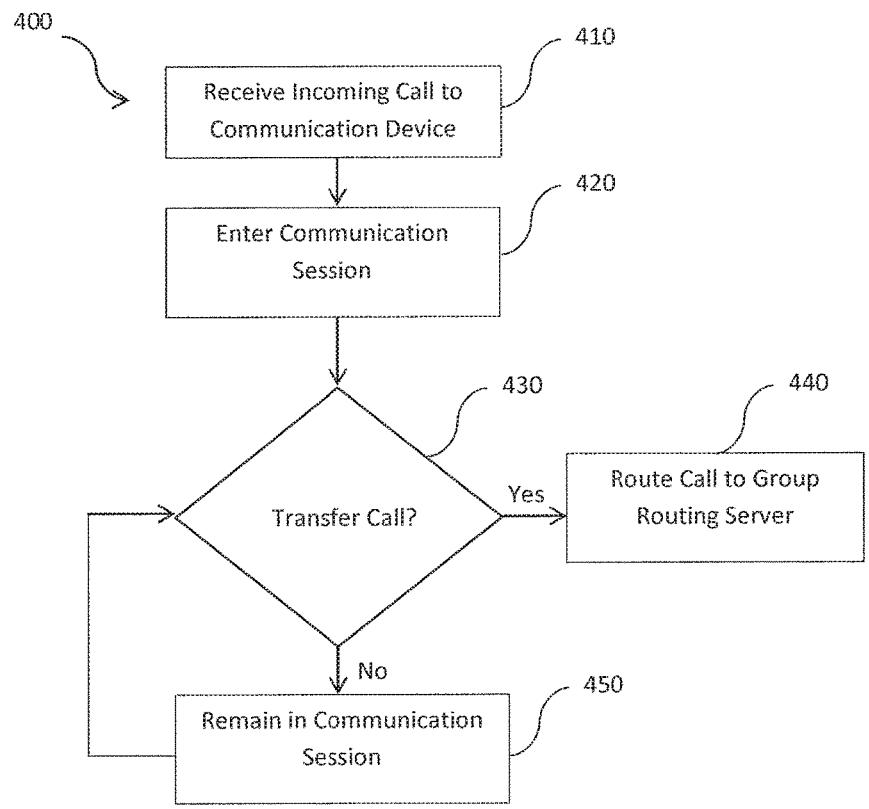
FIG. 4 is a flowchart illustrating a method for operating a communication device with a group routing server according to an embodiment of the disclosure.

FIG. 4 is a flowchart 400 illustrating a method for operating a communication device with a group routing server according to an embodiment of the disclosure. In particular, the method shows an operation for transferring a call from one communication device to another communication device within an organization that uses the group routing server.

At operation 410, the communication device may receive the incoming call. The incoming call may or may not include the assistive communication service depending on the determination made by the group routing server (as described by FIG. 3).

At operation 420, the communication device may enter the communication session. At some point during the communication session, the near-end user may desire to transfer the call. For example, the near-end user may be a receptionist that may be situated to receive calls initially before transferring calls on to other individuals within the organization. In some situations, the near-end user may have received the call by mistake or otherwise determine that a different individual within the organization may be better suited to handle the call. In any of these situations, the communication device may initiate the transfer which may then be processed (i.e., facilitated) by the group routing server at operation 440 in that the group routing server may determine if the assistive communication service is needed for the new desired party to the call according to the routing rules discussed above. In some embodiments, the communication device or group routing server may route the call to another routing server to determine if the assistive communication device is needed for the new desired party and process the transfer.

In some embodiments, transferring a call may terminate the communication session with the assistive communication service even if the assistive communication service is used before and after the transfer. In such an embodiment, the connection with the assistive communication service may be terminated while the group routing server determines whether or not a new session should be initiated. The result of such an embodiment may be that a different communication assistant is used before and after the call transfer.

In some embodiments, transferring a call may not result in terminating the communication session with the assistive communication service when the assistive communication service is used before and after the transfer. In such an embodiment, the assistive communication service and the group routing server may negotiate a handoff between the communication assistant and the device that is going to be part of the communication session. The result of such an embodiment may be that the same communication assistant may be used before and after the call transfer.

If a call transfer is not initiated, the communication device may simply remain in the communication session at operation 450 until the communication is terminated.

Figure 5:
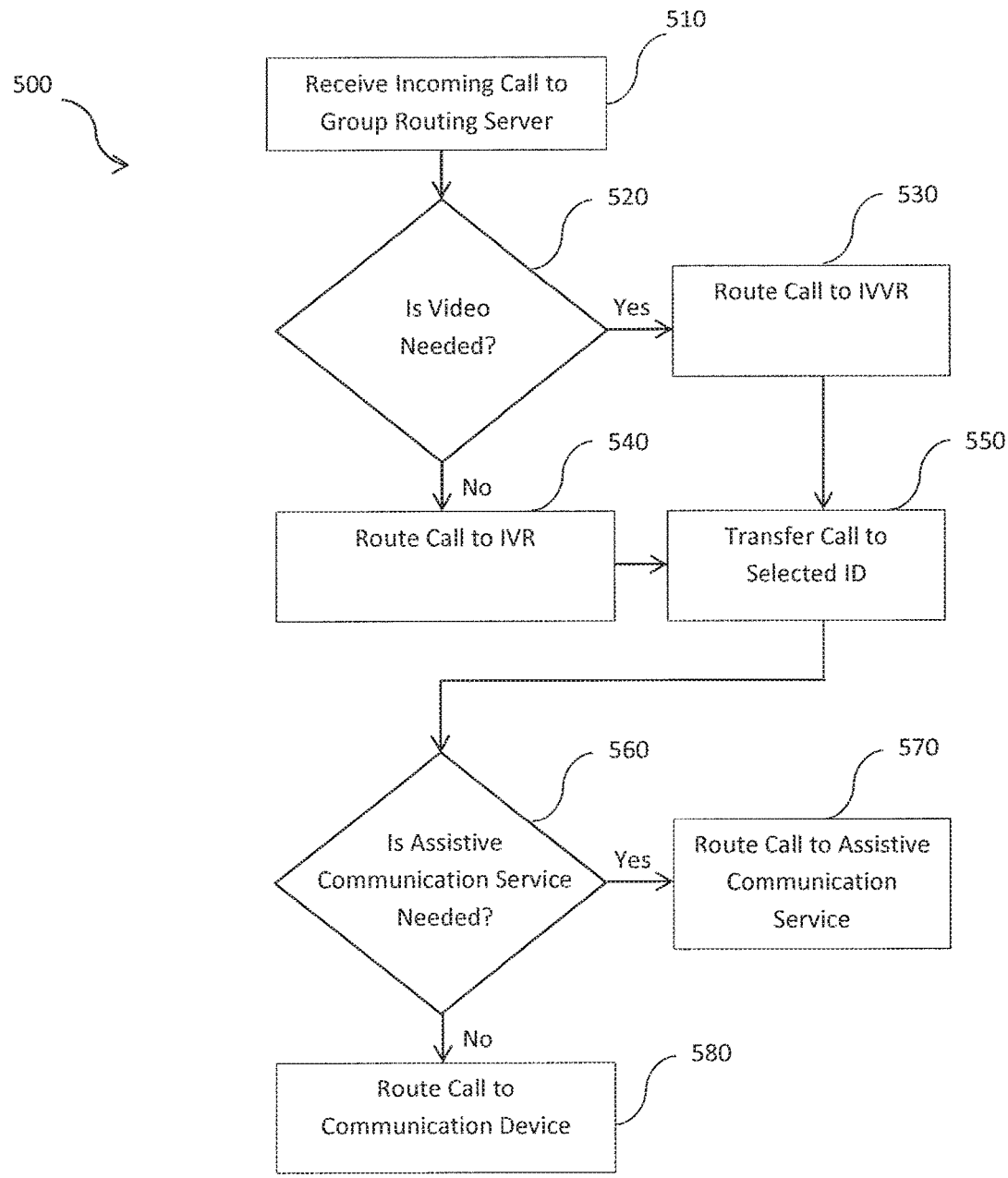
FIG. 5 is a flowchart illustrating a method for operating a group routing server that incorporates an automated menu system according to an embodiment of the disclosure.

FIG. 5 is a flowchart 500 illustrating a method for operating a group routing server that incorporates an automated menu system according to an embodiment of the disclosure. The automated menu system may include at least one of an interactive voice response (IVR) system and an interactive voice and video (IVVR) system. The IVR system may be configured to detect voice and/or touch tones to move through a menu of options that may be pre-recorded and/or dynamically generated to direct callers on how to proceed. The IVVR system may provide similar functionality along with additional video contents and video calling capabilities. Such video contents may include instructions provided using sign language and the ability to automatically detect certain gestures or provide other input options for an audibly-impaired user to advance through the menu.

At operation 510, the incoming call may be received by the group routing server. At operation 520, the group routing server may determine whether video is needed for the call with the far-end user. For example, the group routing server may detect if the call originated from a communication device associated with an audibly-impaired user. In some embodiments, the detection may be based on similar factors as discussed above for whether the assistive communication service is needed (e.g., whether the call was received from ITRS or PSTN, signaling, metadata, or other methods to determine the abilities of the far-end user).

At operation 530, the call may be routed to the IVVR system if it is determined that video is needed. At operation 540, the call may be routed to the IVR system if it is determined that video is not needed. In some embodiments, the determination for video being needed may not solely be based on whether the far-end user is audibly-impaired. For example, audibly-capable users may have equipment that is capable of viewing video from an IVVR system such that an IVVR system may be offered to audibly-capable users. In such a system, a third option may be used during operation 520 that determines whether an IVVR system is used that has sign language capabilities or that does not have sign language capabilities. Such a determination may be determined based, at least in part, on the abilities of the user.

At operation 550, the call may be transferred to a selected ID. For example, at some point during the operation of the automated menu system (e.g., whether IVR or IVVR), the far-end user may be transferred out of the automated system and transferred to a live user.

At operation 560, the group routing server may determine whether the assistive communication service is needed for a call between the far-end user and the live user. The call may be routed to the assistive communication service (operation 570) if needed or to the communication device (operation 580) if the assistive communication service is not needed in a manner similar to what is described above with respect to FIG. 3.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A group routing server for assisting an organization to route calls to communication devices and an assistive communication service according to users having different language abilities, the group routing server comprising:
    memory having stored therein routing rules for an organization and an ID database with individual unique IDs for a defined set of communication devices managed by the group routing server for the organization; and
    a processor operably coupled with the memory, the processor configured to:
        receive an incoming call from a far-end communication device initiating the call to a group unique ID associated with the organization or to one of the individual unique IDs;
        determine a destination communication device from among the defined set of communication devices of the organization to which the incoming call is to be routed by the group routing server of the organization;
        determine language abilities of a far-end user associated with a far-end communication device initiating the incoming call based, at least in part, on detecting whether the incoming call is received from an Internet-based Telecommunications Relay Service (ITRS) network or a public switched telephone network (PSTN);
        determine whether an assistive communication service is needed for providing interpretive services based, at least in part, on differing language abilities between the far-end user and a near-end user associated with the destination communication device, the differing language abilities between the far-end user and the near-end user based on sign language;
        route the incoming call to the assistive communication service according to the routing rules for the organization if the assistive communication service is determined to be needed; and
        route the incoming call directly to the destination communication device according to the routing rules for the organization if the assistive communication service is not determined to be needed.

2. The group routing server of claim 1, wherein the processor is configured to determine a language ability of the far-end user based, at least in part, on metadata sent with the incoming call indicating the language ability of a calling party using the far-end communication device.

3. The group routing server of claim 1, wherein the processor is configured to determine a language ability of the far-end user based, at least in part, on signaling information received when establishing the incoming call indicating the language ability of a calling party using the far-end communication device.

4. The group routing server of claim 1, wherein the assistive communication service includes a video relay service including a communication assistant for providing sign language translation for an audibly-impaired user participating in a communication session established between the far-end communication device and the destination communication device.

5. The group routing server of claim 1, wherein the ID database further includes an indicator for a language ability for each communication device managed by the group routing server for the organization.

6. The group routing server of claim 1, wherein the processor is configured to determine the destination communication device responsive to selections made during an automated menu system.

7. A method of routing incoming calls to communication devices within an organization, the method comprising:
   receiving an incoming call from a far-end communication device to a group routing server of an organization dedicated to a defined set of communication devices of the organization, the group routing server having an ID database with individual unique IDs for the defined set of communication devices managed by the group routing server for the organization;
   determining a first language ability of a far-end user associated with the far-end communication device based, at least in part, on detecting whether the incoming call is received from an Internet-based Telecommunications Relay Service (ITRS) that provides a directory of the individual unique IDs for audibly-impaired users or from and a public switched telephone network (PSTN);
   determining a second language ability of a near-end user associated with a destination communication device selected from among the defined set of communication devices within the organization;
   routing, via routing rules for the organization, the incoming call to an assistive communication service if the first language ability and the second language ability are different based on sign language; and
   routing, via the routing rules for the organization, the incoming call directly to the destination communication device if the first language ability and the second language ability are the same.

8. The method of claim 7, wherein the first language ability and the second language ability are different based on one being audibly-impaired and the other being audibly-capable.

9. The method of claim 7, wherein the first language ability of the far-end user associated with the far-end communication device is determined to be sign language.

10. The method of claim 9, further comprising routing the incoming call to an interactive voice and video (IVVR) system having sign language capability prior to routing the incoming call to the destination communication device or the assistive communication service depending on the first language ability of the far-end user.

11. The method of claim 7, wherein determining the first language ability of the far-end user associated with the far-end communication device is further responsive to at least one of analyzing information from metadata sent by the far-end communication device with the incoming call and analyzing signaling information sent by the far-end communication device while establishing the call.

12. The method of claim 7, wherein determining the second language ability is responsive to querying the ID database stored in the group routing server to retrieving stored information about a language ability of the near-end user associated with the destination communication device.

13. The method of claim 7, further comprising transferring the call to another destination communication device selected from among the defined set of communication devices within the organization by:
   determining a third language ability of another near-end user associated with the another destination communication device;
   connecting the call to the assistive communication service and the another destination communication device if the first language ability and the third language ability are different; and
   connecting the call directly to the another destination communication device if the first language ability and the third language ability are the same.

14. The method of claim 13, wherein transferring the call includes maintaining the call with a same communication assistant at the assistive communication service during the transfer to remain after transfer is complete if the assistive communication service is utilized both prior to the transfer and after the transfer.

15. The method of claim 7, wherein receiving incoming calls includes directing all incoming calls to the group routing server for a determination of the first language ability of the far-end user regardless of whether or not the incoming call was placed to a group ID for the organization or to an individual unique ID for an individual communication device within the organization.

16. The method of claim 7, wherein routing the incoming call to the assistive communication service includes routing the call to a video relay service (VRS) configured to provide speech to sign language translation services between an audibly-impaired user and an audibly-capable user.

* * * * *